United States Patent [19]

Radichio

[11] 4,309,875

[45] Jan. 12, 1982

[54] PIPE FREEZER OR THE LIKE

[75] Inventor: Arthur Radichio, Hempstead, N.Y.

[73] Assignee: Gerald M. D'Agostino, Roslyn Heights, N.Y.; a part interest

[21] Appl. No.: 183,474

[22] Filed: Sep. 2, 1980

Related U.S. Application Data

[63] Continuation of Ser. No. 39,068, May 14, 1979, abandoned.

[51] Int. Cl.³ .............................................. F16L 55/16
[52] U.S. Cl. .......................................... 62/66; 62/293; 62/530; 165/154; 165/104.17
[58] Field of Search .................... 62/293, 439, 530, 66; 165/154, 104 S, 169

[56] References Cited

U.S. PATENT DOCUMENTS

| | | | |
|---|---|---|---|
| 1,684,672 | 9/1928 | Hill | 165/154 X |
| 2,001,515 | 5/1935 | Barrow | 165/154 X |
| 2,035,341 | 3/1936 | Radloff | 165/169 X |
| 2,672,323 | 3/1954 | Larson | 165/154 X |
| 3,553,976 | 1/1971 | Cumine et al. | 62/293 X |
| 3,926,006 | 12/1975 | Brooks et al. | 62/293 X |

*Primary Examiner*—William E. Tapolcai, Jr.
*Attorney, Agent, or Firm*—Nolte & Nolte

[57] ABSTRACT

A self contained freezing device for forming a plug of ice within a pipe section. A refrigeration unit supplies refrigerant to a cradle like freezer unit within which the section of pipe to be frozen is held in spaced relation to the inner face of the freezer. The space between the underside of the pipe and the inner face of the freezer is filled with water, for example by spraying. As the water freezes, in contact with the cradle like freezer unit, it covers the outer surface of the pipe section with an ice jacket. Alternatively, a bag of freezable jel may be substituted for the water spray and placed over the inside face of the freezer; and then the pipe section is placed within the fold of the bag. In the case of either alternative, the refrigerant is maintained inside the freezer, and out of contact with the pipe.

7 Claims, 4 Drawing Figures

PIPE FREEZER OR THE LIKE

This is a continuation of application Ser. No. 39,068 filed 5/14/79, now abandoned.

BACKGROUND OF THE INVENTION

In checking water, oil, gas or other pipelines or conduits for leaks, or for other purposes, or for repairing or replacing pipeline sections it was at one time the practice to drain off part of the line, or to sever the pipe and cap the exposed end thereof with a plate or similar cover. This, of course, was a time consuming and expensive procedure.

More recently the accepted method has been to freeze a section of the pipe, a water pipe, for instance, without cutting it or draining it of its contents; and thereafter testing or repairing, or working on that portion of the pipeline which is located "downstream" of the frozen pipe section. After the testing, repairs, or pipe work or replacement has been completed, the section that was frozen and its contents are permitted to thaw, thus resuming the flow of water through the pipeline as a whole.

A most widely used technique to freeze a section of the pipe is to spray refrigerant gas directly onto the pipe section. This is extremely expensive.

According to another practice in the trade a ring like or annular cover is placed around a small section of pipe and provided with radial lips that seal the end portions upon which the pipe section to be frozen rests. The arrangement is such that there is a free space or clearance between the outer periphery of the pipe's surface and the inside surface or inner face of the annular member surrounding the pipe section. A refrigerant cooled by a conventional refrigerating unit is circulated through the clearance between the pipe and the annular member, the refrigerant being in actual contact with the outer surface of the pipe section as well as with the inner surface or face of the annular ring like component. With this arrangement, water inside the pipeline section is frozen so as to form therein an "ice plug", thereby blocking passage of the water through the pipe and permitting repairs to be made, or testing procedures, or replacements, or whatever else may be necessary or desirable, "downstream" of the ice plug without cutting or severing the pipe or draining its contents.

The practice just referred to wherein the refrigerant is charged into a gap or clearance between the pipe work piece and the ring like or annular member that encloses the pipe is not without its disadvantages. For one, the preferred refrigerant, namely, brine, is, of course, a strongly saline solution of sodium chloride or calcium chloride either of which is difficult and expensive to use. Other refrigerant materials as, for example, sulpher, dioxide or methyl bromide are more efficient from the point of view of cost but are also much more hazardous to use. As will be understood they can produce seriously adverse effects, and even death.

Another disadvantage of the prior systems is cost. Some of these are operated or controlled by hand valves or the like; or require cumbersome and expensive latching devices to maintain an air tight seal against refrigerant leakage in or from the passageway between the pipe to be frozen and the ring like annular member embracing it in spaced relationship therewith.

The present invention contemplates a method and means for eliminating or reducing at least some of the prior art disadvantages specified. To these and other ends it proposes a self contained refrigeration system with freezer unit within which the refrigerant is circulated and recirculated, out of contact with the pipe section and its contents which are to be frozen.

SUMMARY OF THE INVENTION

To overcome difficulties, problems and disadvantages such as those outlined or indicated above, apparatus according to the present invention preferably comprises a self contained unit within which the refrigerant is circulated and recirculated. A conventional, mechanical refrigerating or compression system supplies liquified refrigerant under pressure to a valve, beyond which the pressure is very small: such that the refrigerant evaporates rapidly. While doing so the refrigerant courses through the self contained freezer unit, expands, and cools to well below freezing. The refrigerant gas is thereupon returned to its originating site for subsequent recirculation and repetition of the same procedure.

The pipe freezing device itself may be substantially U-shaped in section—much like a semi-cylindrical cradle, so as to receive within its confines a section of the pipe or other work piece that is to be frozen with its contents. Low level end walls projecting from opposed ends of the cradle are constructed and arranged to support the pipe section in spaced relation to the cradle freezer unit, and to form a water seal at either end of the freezer device when the pipe is laid down upon the end wall projections of the freezer.

After the pipe work piece is laid out on the end sealer pieces of the cradle freezer unit, it may be releasably secured or fastened to the cradle by means of an overhanging latch enclosure or the like. Then the space, gap or clearance, or passageway between the pipe and the freezer, intermediate the end sealer walls of the cradle may, according to one embodiment, be filled with water. Ordinary tap water will do for this purpose. As the water freezes under the heat/cold exchanging influence of the refrigerant gas within the freezer unit, it becomes possible to have water in the form of ice jacket the pipe section, and fully cover it.

In another embodiment of the invention, a bag of freezable jel may be placed on the inner face of the cradle and in this alternative application and method the pipe is then placed within the fold of the bag.

The invention further contemplates a plurality of alternative means for first circulating and subsequently recirculating the refrigerant or coolent used to implement the operation of the self contained freezer unit. In one embodiment thereof a hose comprises a supply conduit for the refrigerant during its passage from the refrigeration unit or system to the freezer component associated therewith. A separate return flow conduit, which may be disposed out of contact with the supply conduit or disposed side by side with the supply conduit, provides a passage for return of the coolant to the refrigeration system in a gaseous state, where the coolant is again liquified under pressure and then recirculated through the conduit system.

In an alternative refrigerant supply-return embodiment, the liquified coolant travels via a relatively narrow tubing from the air conditioner to the cradle shaped freezer unit. The coolant returns as a gas via a suction return line hose of wider diameter than the diameter of the supply line tubing. In this arrangement the narrow liquid refrigerant line runs within the larger diameter suction hose return line. In other words the liquified coolant travels through the narrow supply line in one direction whilst the gaseous refrigerant passes through the larger diameter return line travelling in the opposite direction: the liquid supply line being telescoped or running within the suction return line.

BRIEF DESCRIPTION OF THE DRAWINGS

With the above and other objects in view, as will be apparent, the invention consists in the construction, combination and arrangement of parts, all as hereinafter more fully described, claimed and illustrated in the accompanying drawings, wherein:

DETAILED DESCRIPTION

Figure 1:
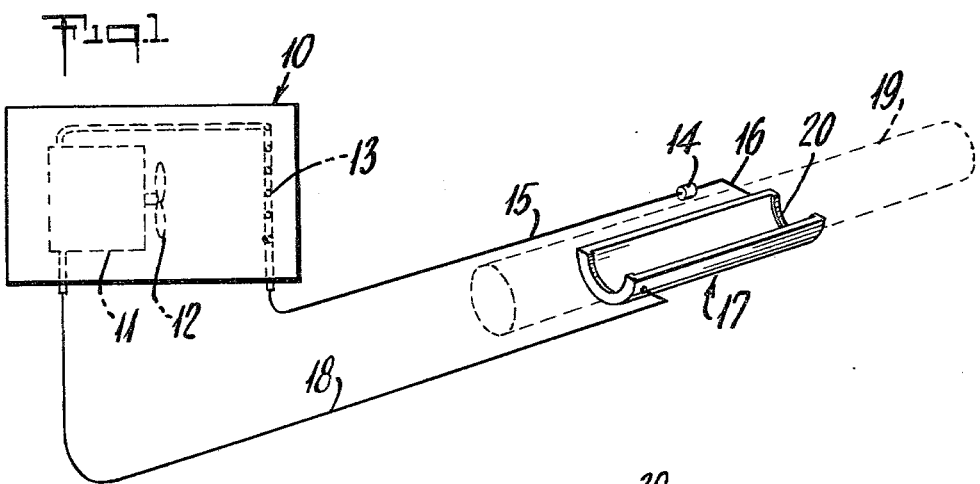
FIG. 1 is a diagramatic view of one embodiment of the present invention, partly in section and partly in perspective, illustrating one form of the freezer unit as comprised in a self contained system which includes separate and distinct supply and return conduits for passing the refrigerant or coolant away from and back to a conventional air conditioning apparatus.

The general arrangement of FIG. 1 includes a conventional refrigeration system 10 provided with a co-acting compressor 11, a fan 12, and a condensor 13. The compressor 11 compresses the gas and pumps it to the condensor 13 where the gas is liquified under pressure and from whence is delivered to a valve or control 14 which in fact may be a metering device in the form of a small fitting which connects the supply line 15 running from the condensor 13 and a direct hose connection 16 to the pipe freezer device 17 of the present invention. The metering device or control valve 14 may be from one-half inch to one inch in length with a small opening of the order to 1/64 or approximately 0.0156 of an inch.

As the liquified coolant under pressure enters the pipe freezer device 17 the pressure falls and the coolant or refrigerant expands into the gaseous state and cools to well below freezing. The gas then passes out of the freezer unit 17 and is returned to the compressor 11 of the unit 10 via a return line or hose conduit 18.

The pipe freezer 17 itself is preferably U-shaped in cross section. It may be relatively short, that is four to about six inches in length. As will be understood, its cradle like U-shaped design is well adapted to receive and retain a pipe 19 or more particularly, a section thereof within its inside surface.

At either end of the freezer 17 a water seal comprising a projecting ridge 20 which may be made of styrofoam or the like is provided.

When the work piece pipe section 19 is laid down upon the styrofoam ridges 20 projecting from the opposed ends of the freezer member 17 there is a space, gap or clearance between the pipe 19 and freezer 17 lengthwise of both pipe 19 and freezer 17. This clearance or space may be filled with water as by spraying or otherwise. Ordinary tap water in situ will do for the purpose. As the water thus utilized freezes under the influence of the coolant which is inside the freezer 17, but out of contact with the pipe 19, it becomes possible to have the water form a jacket of ice fully covering the whole section of pipe 19 and thereby freezing the contents of the pipe 19 which, of course, is the primary purpose of the present invention and illustrative of its utility. The arrangement of FIG. 2 differs from that of FIG. 1 primarily in that the coolant supply line lies within the coolant return line.

That is to say, the unit 10 comprises a compressor 11 for compressing refrigerant gas, a fan 12 and a condensor 13 where the gas is liquified under pressure. From that point the liquid coolant passes through the supply line 15 and through the aperture metering device or valve control 14. Beyond the control member 14 the gas goes through a low pressure zone comprising a small length of connecting hose 16 and then enters and pervades the interior reaches of the self contained freezer unit 17. After expanding and cooling to a temperature below the freezing level, the refrigerant gas returns for recirculation to the compressor 11 of the air conditioner 10 by means of a return suction hose line or conduit 18.

Figure 2:
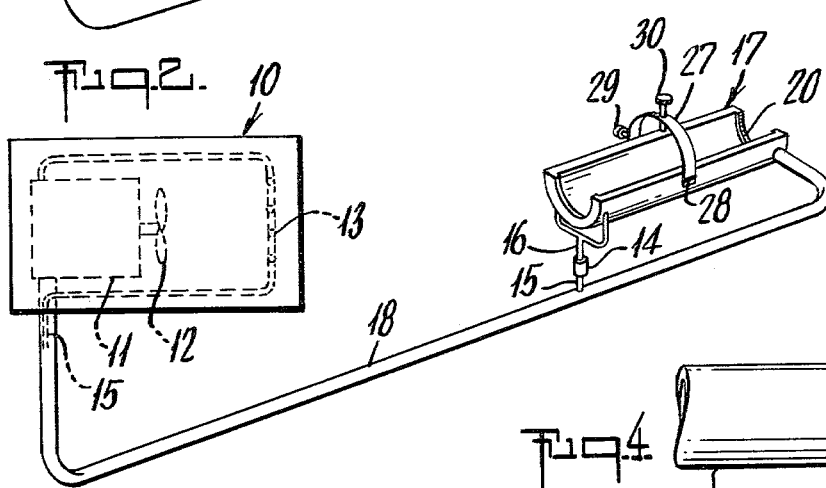
FIG. 2 is a view similar to that of FIG. 1 and comprising another form of the invention wherein the supply line for the liquified coolant is telescoped or passes through the return conduit for the gaseous form of the refrigerant after the same leaves the present self contained freezer unit.

It will be noted that the supply and return lines 15 and 18, respectively, of FIG. 1 are separate and distinct and apart from each other: being connected to the opposite end portions of the freezer unit 17. In FIG. 2 these two coolant lines 15 and 18 are similarly attached to the opposing terminal portions of the freezing member 17. However, in FIG. 2 above and below the freezer zone 17 the two conduits 15 and 18 are telescoped. That is, the liquid supply line 15 lies within the gas suction return line 18. For a telescoping relation of that character the liquid feed line 15 may be made of a length of ⅛ inch outside diameter copper tubing. The larger diameter return gas suction line 18 may be of ⅜ inch outside diameter, rubber, plastic, or synthetic rubber hose.

The box 10 housing the compression or refrigeration unit and comprising the compressor 11 may also be of conveniently small dimensions, that is in the order of about 10 inches high, 13½ inches in lengths and 13½ inches in width.

It will be understood, of course, that with the arrangement of parts illustrated in FIG. 2, with the refrigerant liquid supply line 15 remaining within or inside the refrigerant return suction hose line 18, the variation of the outside diameter of the supply 15 and the inside diameter of the return conduit 18 is such as to provide a space sufficiently large to allow the flow of gaseous coolant to return to the unit 10 for recirculation without obstruction of flow.

Figure 3:
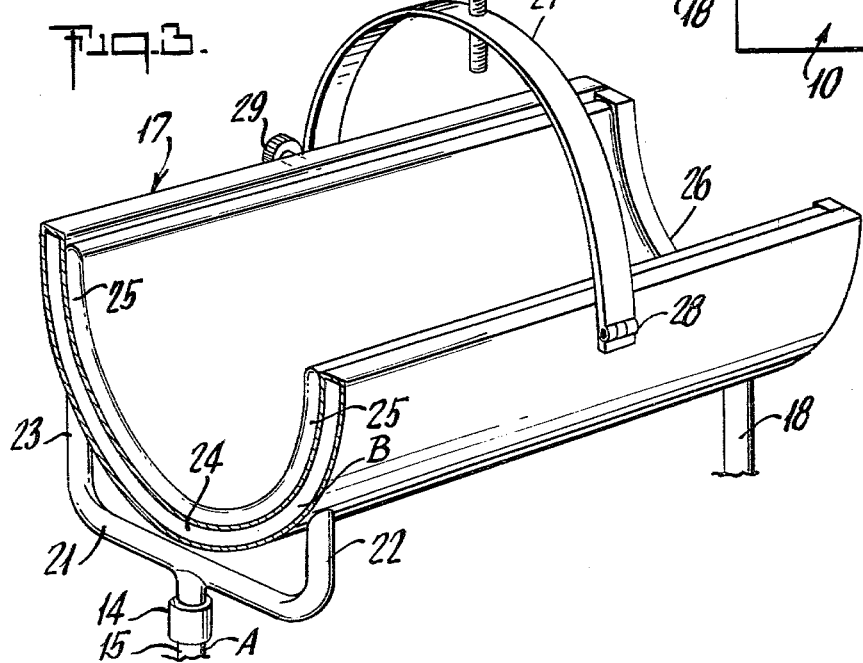
FIG. 3 is a perspective view, specific to the freezer unit, its refrigerant supply and return conduits, and optional clamping means for securing the pipe section to be frozen to the sealer ends or projections upstanding from the inner face of the freezer: with a gap or clearance zone therebetween, lengthwise of both the pipe and the freezer.

The apparatus of FIG. 3 is directed specifically to the particulars of construction of the freezer device 17 and the alternative and preferred embodiment, which comprises the substitution of a malleable bag of freezable jel interposed between the under surface of the pipe section to be frozen and the inside peripheral face of the cradle like U-shaped freezer 17.

Thus the combination and arrangement of parts seen in FIG. 3 may comprise the freezer 17 itself, inlet and outlet conduits 15 and 18, respectively, and means 27 for retaining the pipe section (not shown in FIG. 3) within the cradle like confines of the U-shaped freezer 17 while the pipe is being frozen. The freezer member 17 will include an evaporating chamber for the coolant having a hollow base 21 connected to the end members 22, 23 interposed on either side of an arc like upper chamber 24 therebetween.

The dimensions of the evaporator chamber 24 are co-extensive with those of the freezer 17, of which it forms a part. The chamber 24 provides a continuous passageway for circulation of the coolant under low pressure and in the gaseous state through the freezer 17 and out to the return line 18, without the coolant coming in contact at any time with the pipe section while the pipe section is being frozen.

At either end of the freezer device 17 the present invention in this embodiment provides an upstanding arc shaped ridge 26, which for convenience of manufacture may follow the curvature of the cradle like U-shaped unit 17, and be made integral therewith. A bag of freezable jel 25 may be placed, in situ on top of the inside face of the freezer 17 between the ridges 16 projecting from opposite ends of the cradle 17. With this construction, the liquified coolant under high pressure as at station A will pass through the orifice of the control valve 14 and from thence enter the evaporator chamber 24 under low pressure as at station B. Thereafter, the coolant, now in the gaseous state, passes through the length of the freezer body 17 via the hollow continuous passage 24 to the return line 18.

During the period of transfer of the coolant from the entrance of the evaporator chamber 24 to the exit end thereof in the freezer device 17 the bag 25 of jel is frozen. In that state the bag 25 acts as a heat/cold exchanger in relation to the pipe work piece placed within the fold of the bag 25. As will be apparent with this arrangement as described the pipe section that is being frozen will remain at all times out of contact with the refrigerant or coolant substance.

To maintain the pipe temporarily with the U-shape of the freezer 17 on the projecting ridges 25, a pipe clamp 27 in the shape of an arc may be releasably hinged as at 28 to one side of the freezer 17 and midway of its longitudinal extension. The free end of the clamp 27 may be provided with a locking pin 29 adapted to form a closure with the other side of the freezer 17 at a point in alignment with the position of the hinge member 28. The relative fit between the pipe within the cradle of the freezer unit 17 may be adjusted as required by means of the set screw 30 situated at the top of the arc in the curved clamping member 27.

Figure 4:
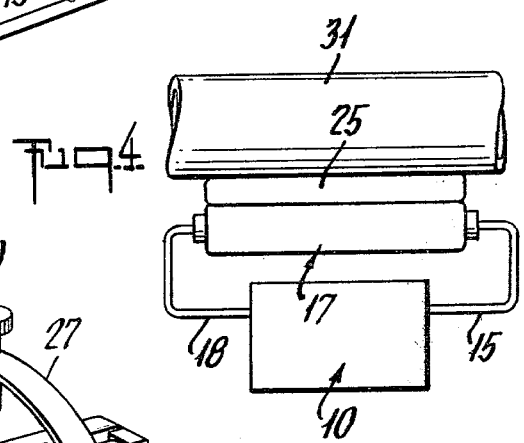
FIG. 4 is a schematic delineation of two alternative constructions of the present self contained freezer unit operatively associated with a sectional longitudinal work piece.

In FIG. 4 there is diagramatically illustrated the clearance, gap, or separation between the freezer unit 17 and the section of pipe 31 that is to be frozen. Interposed between these two members 17, 31 the invention provides a separator or cold transfer medium 25 which may be either the bag of freezable jel 25 or the tap water ice. In either of these two alternative procedures the coolant courses from the supply line 15 through the freezer device 17 and thence back to the refrigeration unit 10 via the return conduit 18, without at any time coming into contact with the pipe 31 or otherwise leaving the closed system.

What is claimed is:

1. The combination with a refrigerant unit of pipe freezing apparatus comprising a pipe freezer, means connecting the freezer to the refrigeration unit for passing a refrigerant in the gaseous state through the freezer and back to the refrigeration unit, and means constituting tap water interposed between the pipe and the freezer and frozen in situ by the cold from the freezer for transferring cold from the refrigerant and the freezer to the pipe while maintaining the freezer out of contact with the pipe.

2. An apparatus of claim 1 wherein the pipe freezer is shaped like a cradle to fit around the pipe.

3. The apparatus of claim 1 wherein the pipe freezer is U-shaped to hold the pipe while the pipe is being frozen.

4. The apparatus of claim 1 wherein the refrigeration unit supplies liquid coolant to a metering device said metering device comprising means for placing said liquid under pressure and for releasing the same to the freezer for expansion, said means consisting of a small length of conduit with a restricted orifice.

5. The apparatus of claim 1, wherein the means for passing the refrigerant through the freezer and back to the refrigeration unit comprises two telescoping conduits through which said refrigerant flows in the gaseous state in opposite directions.

6. The apparatus of claim 5 wherein the conduit to the freezer lies within the return conduit to the refrigeration unit.

7. Method of freezing the contents of at least a section of a liquid containing conduit with a cradle like freezer unit constructed and arranged to transmit cold in situ above the cradle construction, comprising the steps of moving the pipe and freezer into adjacent spaced relation interposing water to be frozen between the freezer and the pipe to maintain the pipe out of contact with the freezer and to transmit cold from the freezer to the pipe.

* * * * *

UNITED STATES PATENT AND TRADEMARK OFFICE
CERTIFICATE OF CORRECTION

PATENT NO. : 4,309,875
DATED : January 12, 1982
INVENTOR(S) : Arthur Radichio

It is certified that error appears in the above-identified patent and that said Letters Patent are hereby corrected as shown below:

In Claim 1, line 1 [refrigerant] should be <u>refrigeration</u>

Signed and Sealed this

Twenty-fifth Day of May 1982

[SEAL]

Attest:

Attesting Officer

GERALD J. MOSSINGHOFF
Commissioner of Patents and Trademarks